(12) United States Patent
Liu

(10) Patent No.: US 9,189,251 B2
(45) Date of Patent: Nov. 17, 2015

(54) METHOD AND APPARATUS FOR ADJUSTING WINDOW DISPLAY STATUS

(75) Inventor: Bo Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 637 days.

(21) Appl. No.: 12/356,320

(22) Filed: Jan. 20, 2009

(65) Prior Publication Data

US 2009/0187851 A1    Jul. 23, 2009

(30) Foreign Application Priority Data

Jan. 21, 2008   (CN) .......................... 2008 1 0056528

(51) Int. Cl.
*G06F 3/048* (2013.01)
*G06F 9/44* (2006.01)
*G06F 3/0481* (2013.01)
*G06F 3/0488* (2013.01)

(52) U.S. Cl.
CPC ............ *G06F 9/4443* (2013.01); *G06F 3/0481* (2013.01); *G06F 3/04886* (2013.01); *G06F 2203/04804* (2013.01)

(58) Field of Classification Search
CPC .................... G06F 2203/04804; G06F 3/0488; G06F 3/04886
USPC .......................... 715/788, 767, 768, 809, 864
See application file for complete search history.

(56) References Cited

U.S. PATENT DOCUMENTS

| | | | | |
|---|---|---|---|---|
| 5,638,501 | A * | 6/1997 | Gough et al. .................. | 345/639 |
| 5,651,107 | A * | 7/1997 | Frank et al. ................... | 715/768 |
| 6,429,883 | B1 * | 8/2002 | Plow et al. .................... | 715/768 |
| 6,981,227 | B1 * | 12/2005 | Taylor ........................... | 715/768 |
| 7,515,135 | B2 * | 4/2009 | Varanda ............... | G06F 3/0481 345/156 |
| 8,191,003 | B2 * | 5/2012 | Brown et al. ................. | 715/769 |
| 2003/0142132 | A1 * | 7/2003 | Brown et al. ................. | 345/768 |
| 2005/0275633 | A1 * | 12/2005 | Varanda ........................ | 345/173 |
| 2008/0174564 | A1 * | 7/2008 | Kim ..................... | G06F 3/0488 345/173 |

FOREIGN PATENT DOCUMENTS

JP          11194867        7/1999

* cited by examiner

*Primary Examiner* — Dino Kujundzic

(57) ABSTRACT

The invention discloses a method for adjusting a window display status, which relates to a technology for adjusting the window display status while facilitating an adjustment for the existing window display status. The method includes: receiving an instruction including an adjustment parameter and a window ID; determining an application corresponding to the window ID based on the window ID, wherein the application having a corresponding window once the application is executed; and adjusting a display status item in the application window based on the adjustment parameter. The present invention further discloses an apparatus for implementing the method as described above.

8 Claims, 2 Drawing Sheets

PARSE WINDOW DISPLAY STATUS ADJUSTMENT INSTRUCTION INPUT BY USER, EXTRACT ID OF WINDOW TO BE ADJUSTED AND ADJUSTMENT PARAMETER FROM ADJUSTMENT INSTRUCTION — 101

SEND ADJUSTMENT PARAMETER TO APPLICATION OF WINDOW BASED ON ID EXTRACTED AT STEP 101 — 102

APPLICATION OF WINDOW ADJUSTS DISPLAY STATUS OF WINDOW ACCORDING TO ADJUSTMENT PARAMETER — 103

METHOD AND APPARATUS FOR ADJUSTING WINDOW DISPLAY STATUS

BACKGROUND OF THE INVENTION

1. Field of Invention

The present invention relates to adjustment of a window display status, and more particularly, to a method and an apparatus for adjusting a window display status.

2. Description of Prior Art

With development of the computer technology, users have growing demands, while various applications with enhanced functions have been developed to meet the demands, especially user experience. Taking an operating system of a microcomputer as an example, Windows XP supports the 3D animation effect, while Windows Vista supports the Aero display effect.

In general, computer users often need to open a plurality of windows of applications at the same time when using the computer. While multiple windows are opened, only one foreground window is activated for use at a time. If it is required to use other windows, the user has to switch to another window. Although all the operating systems support size adjustment for each window, a smaller display window will inevitably lead to inconvenient use when multiple windows share one screen. In addition, user demands for personalized applications are growing. A single default display status hampers the user's personalization requirements.

In addition, for convenient portability, use of a mobile terminal device such as a personal digital assistant (PDA) and a mobile phone is popular. Compared with a personal computer and a notebook computer, such device has a small input equipment, i.e. it has a keyboard of a very small area, leading to inconvenient information input. To address this problem, such device is generally provided with a soft keyboard, i.e. a virtual keyboard. The virtual keyboard also leads to a problem: a ground window will be blocked by the virtual keyboard, when the virtual keyboard serves as a foreground display. When a screen of the device is small, such as having a resolution of less than 240, the virtual keyboard covers even half of the background window, thus resulting in poor user experience.

Thus there are at least following problems in the conventional solutions: a window display status can't be adjusted dynamically so that an entering window or a virtual keyboard window will make an impact on the other editable windows in a smart terminal of a small size.

SUMMARY OF THE INVENTION

In view of this, an object of present invention is to provide a method and an apparatus for adjusting a window display status, which implements a dynamic adjustment for the window display status, is user-friendly and meets users' personalized display settings.

To achieve the object, a technical solution according to the present invention is proposed as follows.

A method for adjusting a window display status is provided, which comprises steps of:
receiving an instruction including an adjustment parameter and a window ID;
determining an application corresponding to the window ID based on the window ID, wherein the application having a corresponding window once the application is executed; and
adjusting a display status item in the application window based on the adjustment parameter.

Preferably, the step of adjusting a display status item in the application window based on the adjustment parameter comprises:
searching for a status item to be adjusted in the application, and assigning the status item with the adjustment parameter.

Preferably, the step of determining an application corresponding to the window ID based on the window ID comprises:
parsing the instruction;
extracting the window ID from the instruction; and
determining an application corresponding to the window ID based on the window ID.

Preferably, the instruction is input through a specified key, a mouse or an external button.

Preferably, the window display status includes:
a contrast, a luminance, a color and/or a transparency.

Preferably, the application window includes: a virtual keyboard and/or an entering window.

An apparatus for adjusting a window display status is provided, which comprises:
a reception unit for receiving an instruction including an adjustment parameter and a window ID;
a determination unit for determining an application corresponding to the window ID based on the window ID; and
an adjustment unit for adjusting a display status item in the application based on the adjustment parameter.

Preferably, the adjustment unit comprises:
a search module for searching for a status item to be adjusted in the application; and
an assignment module for assigning the status item with the adjustment parameter.

Preferably, the determination unit comprises:
a parsing module for parsing the instruction;
an extraction module for extracting the window ID from the instruction; and
a determination module for determining an application corresponding to the window ID based on the window ID.

Preferably, the apparatus further comprises:
an input unit for inputting the instruction.

Preferably, the input unit is a specified key, a mouse and/or an external button.

The window display status can't be adjusted in the existing smart terminal window application with the initiation by the user, leading to a poor user experience. In displaying a mobile smart terminal, a virtual keyboard covers most of the screen, thus the user has to switch back and forth or to minimize an entering window. According to the present invention, respective application windows are set in such a way that their display statuses are adjustable. An adjustment instruction is input through an input key as required. After receiving the adjustment instruction, an application implements an adjustment for a window display status based on the adjustment parameter. Particularly, when it is required to view a ground window under a foreground window, the ground window is viewed by adjusting the display status of the foreground window as a transparent status, without closing the foreground window. In addition, the adjustability of the window display status can enhance the user experience and meet user's personalized setting requirements for window display.

DETAILED DESCRIPTION OF PREFERRED EMBODIMENTS

Hereinafter, embodiments of the present invention will be described in detail with reference to the drawings.

Figure 1:
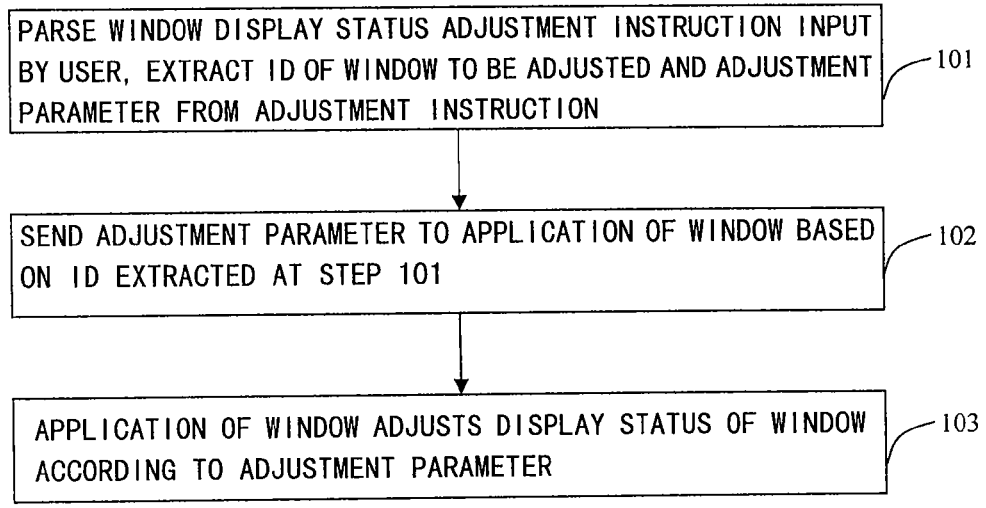
FIG. 1 is a flowchart of a method for adjusting a window display status according to an embodiment of the present invention.

FIG. 1 is a flowchart of a method for adjusting a window display status according to an embodiment of the present invention. As shown in FIG. 1, the method for adjusting the window display status according to the embodiment of the present invention comprises:

Step 101 of parsing a window display status adjustment instruction, which is input by a user, and extracting an ID of a window to be adjusted and an adjustment parameter from the adjustment instruction.

An adjustment for a computer window is taken as an example. A display status adjustment parameter input interface is provided for a window available for respective applications. The user may input a display status adjustment parameter through the input interface. The input may be implemented through a dedicated button, which may be set as a selection key, a parameter setting key or a confirmation key. The selection key is for selecting a window to be adjusted. The confirmation key is for entering a selection for a display status. After determining a display status, the user selects an input adjustment parameter. Here, the window display status includes, but not limited to, a contrast, a luminance, a color and/or a transparency. After selecting a foreground window as the window to be adjusted, the user enters a display status selection interface through the confirmation key. For example, after selecting the contrast being, the current setting value of the contrast is displayed, which is then increased or reduced by the user using the selection key as an input adjustment parameter value. The inputted parameter value is parsed. ID information of a window to be adjusted is determined. A type of a display status to be adjusted is determined, that is, which one of the contrast, luminance, color and transparency is determined to be adjusted. Then the number of parameters to be adjusted is determined.

Alternatively, the adjustment button may also be provided as a window selection key and a setting adjustment key corresponding to different window display status, for example, an adjustment spin buttons for a contrast, a luminance, a color and a transparency. After selecting a window to be adjusted, a turn-down or turn-up adjustment is performed directly using respective buttons. The system converts an amount of spin by the user into different adjustment parameters, and then parses the adjustment parameters.

Furthermore, the adjustment parameter may also be input via a preset parameter input window. After selecting a window to be adjusted by the user, a display status adjustment parameter input interface automatically pops up, through which the user may input a corresponding adjustment parameter value. The above adjustment button may also be implemented by a button on the existing keyboard, as long as it is provided with corresponding functions. The adjustment may also be implemented via a mouse, as long as it corresponds to a window display adjustment function.

In step 102, the adjustment parameter is transmitted to an application of the window based on the ID extracted at step 101. The adjustment parameter needs to be forwarded to an application available in the window. By the application a corresponding window display parameter value is modified so as to change the window display status. With the ID extracted at step 101, a corresponding adjustment status identifier and a parameter adjustment value are sent to the application of the window.

In step 103, the application of the window adjusts the display status of the window according to the adjustment parameter. The application of the window searches for a parameter value of the window corresponding to the display status through an application interface (API), after receiving the adjustment status identifier and the adjustment parameter value, and then updates a previous parameter value with the received adjustment parameter value so as to implement an adjustment for the window display status.

For example, when the received adjustment parameter consists in the contrast is adjusted to 70%. A parameter value for the current window display contrast is replaced with the parameter value of 70%. On the other hand, if some display status is not available in the application of the window, a message of 'display status adjustment not available' or a message of 'adjustment failed' is returned.

An adjustment for a transparency of a window is taken as an example. The application of the window uses a Create WindowEx function of windows to create an entering window. The entering window is modified to have WS_EX_LAYERED attribute using SetWindowLong. Then, a SetLayeredWindowAttributes function is called to modify an alpha value of a foreground window having WS_EX_LAYERED attribute, after receiving parameter adjustment information from the control module. A third parameter of the function is an integer between 0 and 255. When the third parameter is 0, the window is completely transparent. When it is 255, the window is non-transparent. In this way, an Alpha Blending transparent effect for the window is modified.

With a display status adjustment for respective windows, better user experience is achieved. And the user may conveniently set a personalized window display status. Since the alpha value of the foreground window (Alpha Blending is available) is settable, a transparency of the foreground window will be changed simply while implementing display or occlusion of the foreground window without any window switching. The method shown in FIG. 1 is also applicable in any other smart terminals such as a mobile phone, a PAD and the like.

Figure 2:
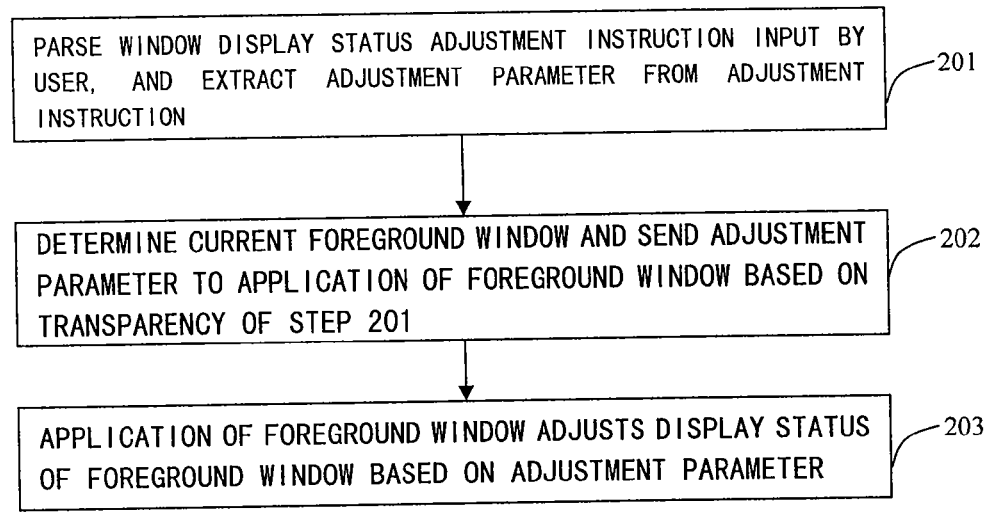
FIG. 2 is a flowchart of another method for adjusting a window display status according to an embodiment of the present invention.

FIG. 2 is a flowchart of another method for adjusting a window display status according to an embodiment of the present invention. As shown in FIG. 2, the method for adjusting the window display status according to the embodiment of the present invention comprises:

step 201 of parsing a window display status adjustment instruction, which is input by a user, and extracting an adjustment parameter from the adjustment instruction. The adjustment parameter is set as an adjustment for the foreground window in default.

An adjustment for a window of a mobile device, such as a mobile phone or a PDA, is taken as an example. Since such device has a screen and a keyboard with a small area, it is generally provided with a screen as large as possible and several function keys, and a virtual keyboard is set therein for inputting information. It is important for the smart terminal to input information. Therefore, a virtual keyboard is also enabled in default for waiting for an information input from the user, when a window of an operating system is opened. The virtual keyboard blocks a portion of a background window, since it is a foreground display item in default, which will certainly make an impact on the user's visual experience.

Moreover, it is inconvenient for the user to continuously move the background window in order to see the blocked portion. A spin button specially for adjusting the virtual keyboard is arranged on the mobile device. With the spin button, an Alpha value for adjusting a transparency of the virtual keyboard is input. Of course, an adjustment parameter value may be inputted by setting a parameter input window. When the virtual keyboard is selected by the user, an interface for inputting an Alpha value will automatically pop up. The user may input a corresponding adjustment parameter value through the interface. Then the input parameter value is parsed to determine the adjusted Alpha value. An amount of spin corresponds to the value of the Alpha. Here, the foreground window further comprises an entering language column, which is equivalent to the virtual keyboard in size. The foreground window can be any other windows. In step 201, the contrast, luminance, color and other parameters are adjusted.

In step 202 in FIG. 2, the current foreground window is determined and the adjustment parameter is sent to an application of the foreground window based on the transparency of step 201. The adjustment parameter input at step 201 is considered as an adjustment for the foreground window in default, and it is forwarded to an application available in the foreground window. The corresponding adjustment parameter value is modified by the foreground window, so as to change the window display status.

In step 203 in FIG. 2, the application of the foreground window adjusts the display status of the foreground window based on the adjustment parameter. The application of the foreground window searches for a parameter value of the foreground window corresponding to the display status, after receiving an adjustment status identifier and an adjustment parameter value, and then updates the existing parameter value using the receiving adjustment parameter value. In this way an adjustment for the display status of the foreground window is implemented.

An adjustment for a transparency of a window is taken as an example. An application of the window uses a Create WindowEx function of windows to create an entering window. The entering window is modified to have WS_EX_LAYERED attribute using SetWindowLong. Then, a SetLayeredWindowAttributes function is called to modify an alpha value of a foreground window having WS_EX_LAYERED attribute, after receiving parameter adjustment information from the control module. A third parameter of the function is an integer between 0 and 255. When the third parameter is 0, the window is completely transparent. When it is 255, the window is non-transparent. In this way, an Alpha Blending transparent effect for the window is modified.

With a display status adjustment for respective windows, better user experiences are achieved, and the user may set a personalized window display status conveniently. Since the alpha value of the foreground window (Alpha Blending is available) is set, a transparency of the foreground window is changed simply while implementing display or occlusion of the foreground window without any window switch.

In a similar way, for a smart terminal such as a mobile device, a display status adjustment for each window is performed according to the flowchart shown in FIG. 1. The description similar with the above will be omitted.

Figure 3:
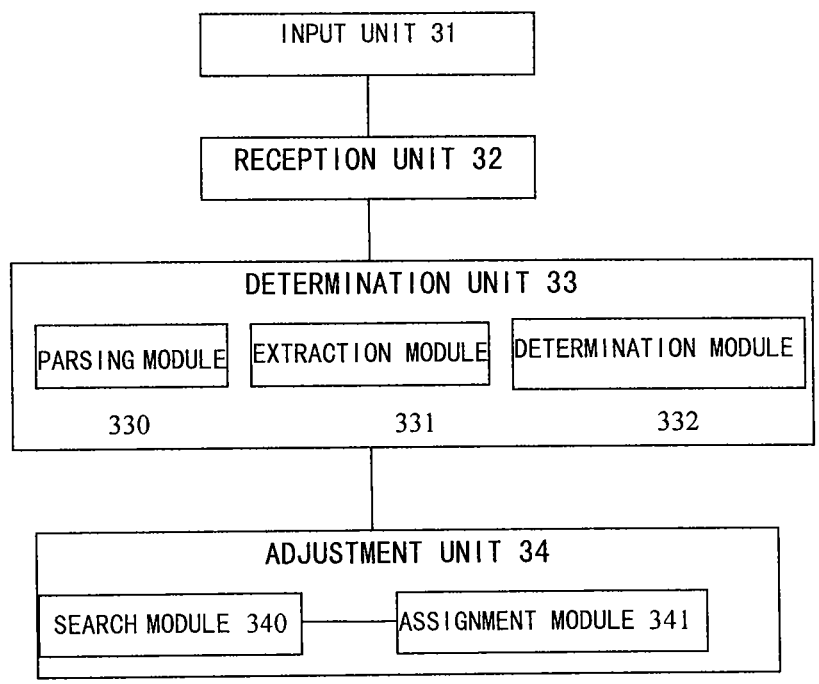
FIG. 3 is a structural schematic diagram of an apparatus for adjusting a window display status according to an embodiment of the present invention.

FIG. 3 is a structural schematic diagram of an apparatus for adjusting a window display status according to an embodiment of the present invention. As shown in FIG. 3, the apparatus for adjusting the window display status according to the embodiment of the present invention comprises: an input unit 31, a reception unit 32, a determination unit 33 and an adjustment unit 34. The input unit 31 is adapted to input an adjustment instruction. It may be either an existing key on a keyboard or a dedicated adjustment button, a mouse capable of display adjustment or a parameter adjustment interface supported by software.

The dedicated adjustment button is taken as an example. The button is a selection key, a parameter setting key or a confirmation key. The selection key is for selecting a window to be adjusted. The confirmation key is for entering a selection for a display status. After determining the display status, the user selects an input adjustment parameter. Here, the window display status includes, but not limited to, a contrast, a luminance, a color or a transparency. The adjustment button may be a window selection key and a corresponding setting adjustment key for different window display status, for example, an adjustment spin button for adjusting a contrast, a luminance, a color and a transparency. After selecting a window to be adjusted, a turn-down or turn-up adjustment is performed directly using respective buttons. The system converts an amount of spin by the user into different adjustment parameters, and then parses the adjustment parameters.

The input unit 31 may be implemented through a parameter input interface supported in software. When a window to be adjusted is selected, an interface for inputting an Alpha value will automatically pop up. The user may input a corresponding adjustment parameter value through the interface. The reception unit 32 is for receiving an instruction comprising an adjustment parameter and a window ID. The determination unit 33 is for determining an application corresponding to the window. The adjustment unit 34 is for adjusting the display status of the window based on the adjustment parameter. The determination unit 33 comprises a parsing module 330, an extraction module 331 and a determination module 332. The parsing module 330 is for parsing the instruction to get an object to be adjusted by the adjustment instruction, that is, to determine a window to be adjusted, a display status to be adjusted, and an adjustment parameter. The extraction module 331 is for extracting information such as an ID of the window to be adjusted, an adjustment display status and an adjustment parameter from the adjustment instruction. The determination module 332 is for determining an application for the window according to the ID of the window. The adjustment unit 34 comprises a search module 340 and an assignment module 341. The search module 340 is for searching for a status item to be adjusted in the application, particularly for determining a specific parameter item to be adjusted by the adjustment instruction from the user, that is, which one of a contrast, a luminance, a color or a transparency is determined to be adjusted. The assignment module 341 is for assigning the status item with the adjustment parameter, particularly for replacing an original parameter value in the application directly with the adjustment parameter value, after determining the adjustment item.

It should be noted that, respective units as shown in FIG. 3 may be implemented through software or a corresponding circuit.

The above are only illustrated embodiments of the present invention without limiting the scope of the present invention.

What is claimed is:

1. A method for adjusting a window display status of a plurality of displayed editable windows in a portable smart terminal including a touch screen, the plurality of displayed editable windows comprising a foreground window and a background window, the method comprising the steps of:

selecting an application window from the plurality of displayed editable windows as the foreground window to be adjusted, the selected application window is a virtual keyboard, and the other windows are background windows;

receiving an instruction including an adjustment parameter and a window ID input by using the selected virtual keyboard itself, the instruction input by using the virtual keyboard itself is displayed in the background window;

parsing the instruction; and adjusting a display status item in the selected virtual keyboard based on the adjustment parameter input to the virtual keyboard itself by a dedicated button being set as a selection key, a parameter setting key or a confirmation key so as to view the background window under the foreground window, the background window is viewed by adjusting the display status of the foreground window as a transparent status, without closing the foreground window.

2. The method according to claim 1, wherein the step of adjusting a display status item in the application window based on the adjustment parameter further comprises: searching for a status item to be adjusted in the application and assigning the status item with the adjustment parameter.

3. The method according to claim 1, wherein the instruction is input through at least one of a specified key, a mouse and an external button.

4. The method according to claim 1, wherein the window display status includes: at least one of a contrast, a luminance, a color and a transparency.

5. A portable smart terminal comprising a touch screen and a processor, the processor is configured to adjust a window display status of a plurality of displayed editable windows in the portable smart terminal, the plurality of displayed editable windows comprising a foreground window and a background window, the processor is further configured to:

select an application window from the plurality of displayed editable windows as the foreground window to be adjusted, the selected application window is virtual keyboard and the other windows are background windows;

receive an instruction including an adjustment parameter and a window ID input by using the selected virtual keyboard itself, the instruction input by using the virtual keyboard itself is displayed in the background window;

determine an application corresponding to the window ID based on the window ID, wherein the processor is further configured to:

parse the instruction; and adjust a display status item in the selected virtual keyboard based on the adjustment parameter input to the virtual keyboard itself by a dedicated button being set as a selection key, a parameter setting key or a confirmation key so as to view the background window under the foreground window, the background window is viewed by adjusting the display status of the foreground window as a transparent status, without closing the foreground window.

6. The portable smart terminal according to claim 5, wherein the processor is further configured to:

search for a status item to be adjusted in the application; and assign the status item with the adjustment parameter.

7. The portable smart terminal according to claim 5, wherein the processor is further configured to input the instruction.

8. The portable smart terminal according to claim 7, wherein the instruction is input by at least one of a specified key, a mouse and/or an external button.

* * * * *